(12) United States Patent
Chang

(10) Patent No.: US 6,345,678 B1
(45) Date of Patent: Feb. 12, 2002

(54) SCOOTER

(76) Inventor: Shian-Pei Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/815,579

(22) Filed: Mar. 21, 2001

(51) Int. Cl.$^7$ ................................................ A63C 5/08
(52) U.S. Cl. ................ 180/181; 180/65.6; 280/87.041; D21/423
(58) Field of Search ................ 180/180, 181, 180/65.1, 65.6, 208, 60, 62; 280/87.041, 87.021, 11.201; 74/425; D21/423

(56) References Cited

U.S. PATENT DOCUMENTS

| | | | | |
|---|---|---|---|---|
| 3,710,965 A | * | 1/1973 | Joosten ........................ | 214/515 |
| 5,020,621 A | * | 6/1991 | Martin ........................ | 180/181 |
| 5,222,567 A | * | 6/1993 | Broadhead et al. ............ | 180/15 |
| 5,330,026 A | * | 7/1994 | Hsu et al. .................... | 180/181 |
| 5,848,660 A | * | 12/1998 | McGreen .................... | 180/206 |
| 5,894,898 A | * | 4/1999 | Catto .......................... | 180/2.2 |
| 5,913,937 A | * | 6/1999 | Lin ............................. | 74/411 |
| 6,014,915 A | * | 1/2000 | Evans .......................... | 74/606 |
| 6,029,763 A | * | 2/2000 | Swisher ...................... | 180/65.6 |
| 6,129,166 A | * | 10/2000 | Sueshige et al. ........... | 180/65.6 |
| 2001/0011202 A1 | * | 8/2001 | Yamawaki ................... | 701/93 |

* cited by examiner

*Primary Examiner*—Brian L. Johnson
*Assistant Examiner*—Daniel Yeagley (57) ABSTRACT

A scooter has a main frame, two rear bars, a rear wheel, and a rear wheel drive mechanism. The rear bars are disposed on a rear end of the main frame. The rear wheel drive mechanism has a rechargeable battery set, an electric motor, a brake device, a first protective casing, a worm wheel, and a second protective casing. The brake device, the rear wheel, the first protective casing, the worm wheel, and the second protective casing are disposed between the rear bars. The electric motor has a drive shaft and a worm. The worm wheel has a pivot shaft passing through the first protective casing, a one-way bearing, the rear wheel, a main bearing, an auxiliary bearing, and the pivot shaft inserted in the brake device. The worm engages with the worm wheel.

2 Claims, 9 Drawing Sheets

SCOOTER

BACKGROUND OF THE INVENTION

The present invention relates to a scooter. More particularly, the present invention relates to a scooter which has a rear wheel drive mechanism.

Figure 1:
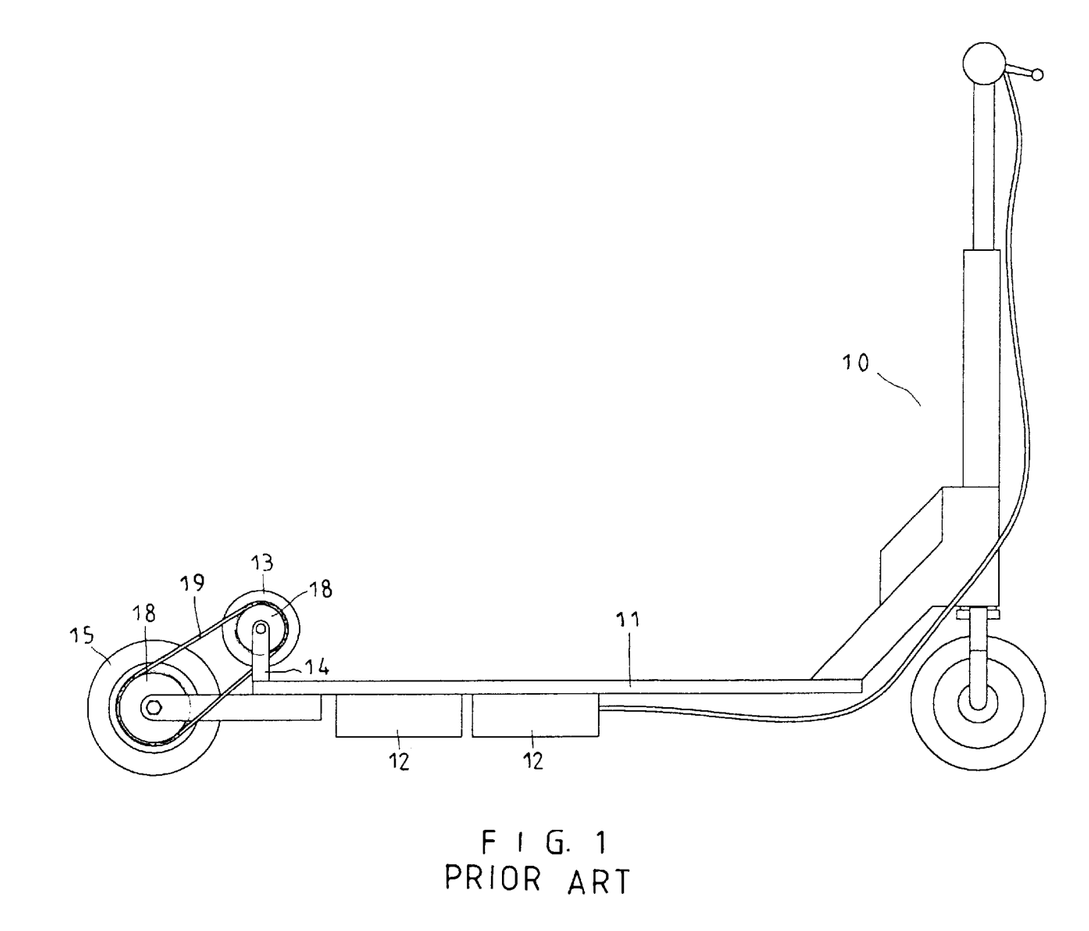
FIG. 1 is a side elevational view of a conventional scooter of the prior art.
Figure 1A:
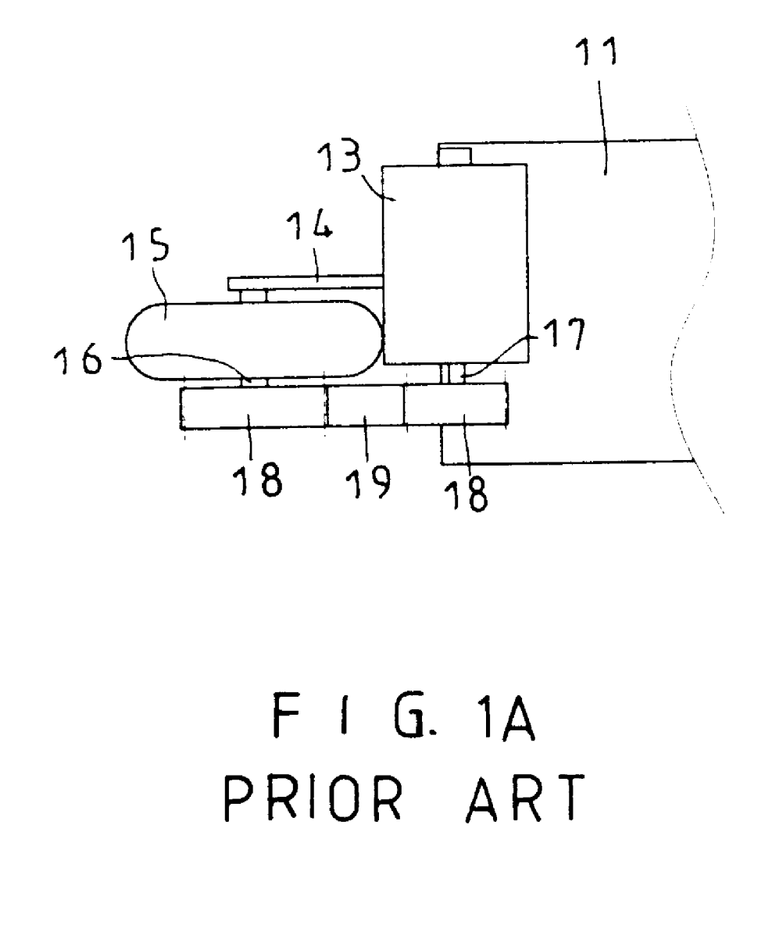
FIG. 1A is a top plan view of a rear portion of a conventional scooter of the prior art.

Referring to FIG. 1, a conventional scooter 10 has a main frame 11, a rear mount 14, a rear wheel 15, and a rear wheel drive mechanism. The rear wheel drive mechanism has a battery set 12 disposed on a bottom of the main frame 11, an electric motor 13 connected to the rear mount 14, a wheel shaft 16 connected to the rear mount 14 and the rear wheel 15, the electric motor 13 having a motor shaft 17, a gear 18 connected to the motor shaft 17, a pinion 18 connected to the wheel shaft 16, and a belt 19 surrounding the gear 18 and the pinion 18. However, the belt 19 will hurt a user while the user touches the belt 19. Furthermore, a vibration of the belt 19 will loosen the belt 19 or tighten the belt 19 so that the drive of the rear wheel 15 is not smooth.

SUMMARY OF THE INVENTION

An object of the present invention is to provide a scooter which has a worm and a worm wheel engaging with the worm so that a drive of a rear wheel is smooth.

Another object of the present invention is to provide a scooter which has a first protective casing and a second protective casing to protect a worm and a worm wheel.

DETAILED DESCRIPTION OF THE INVENTION

Figure 2:
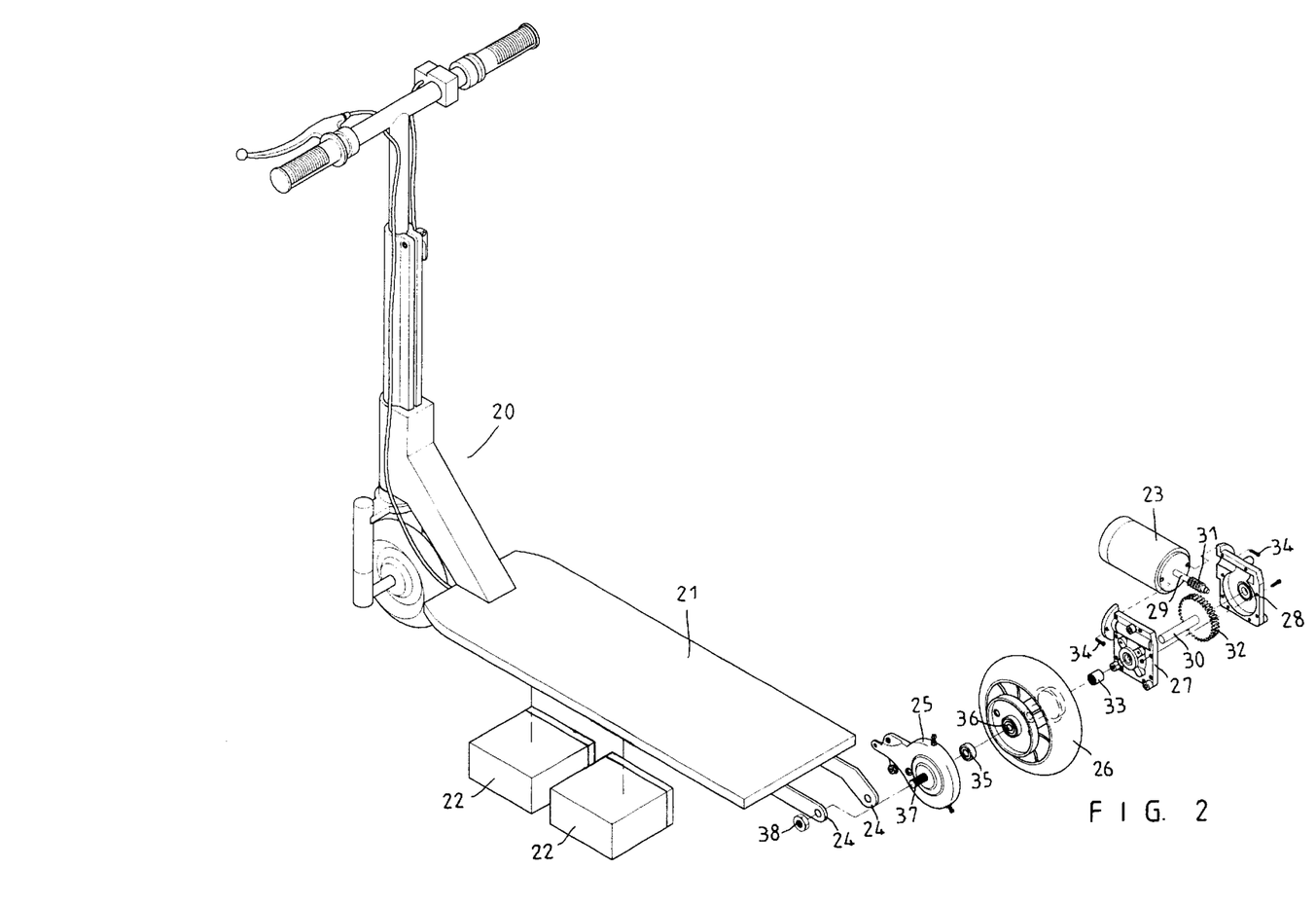
FIG. 2 is a perspective exploded view of a scooter of a first preferred embodiment in accordance with the present invention.
Figure 2A:
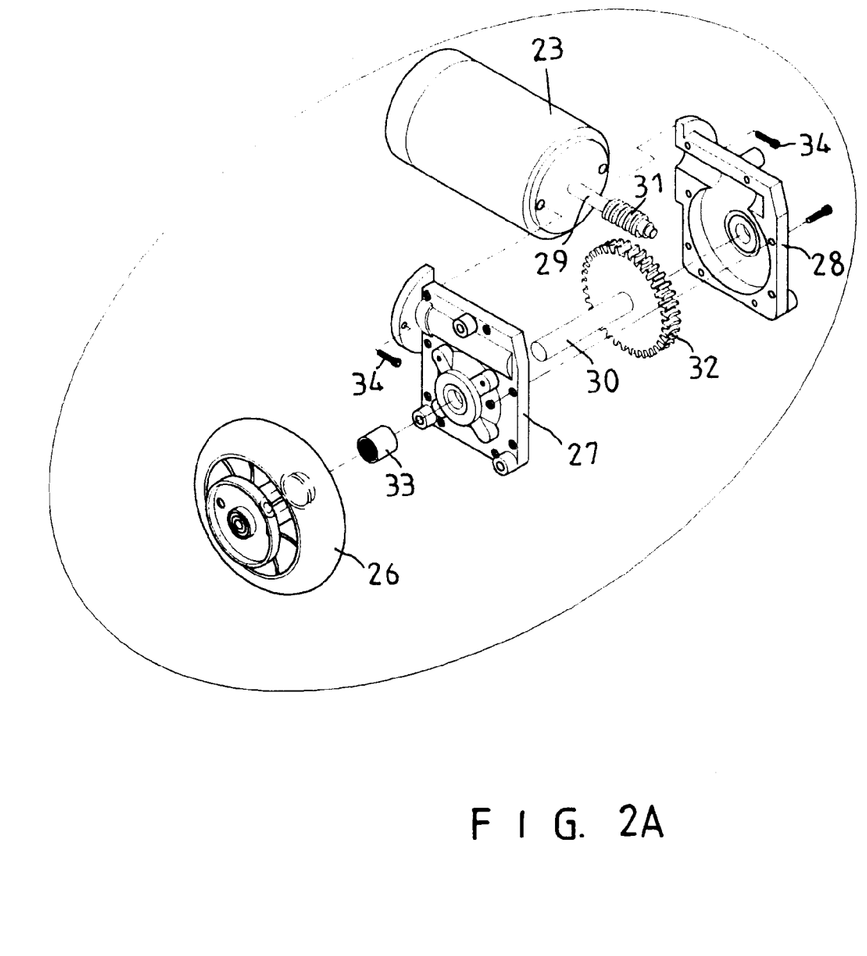
FIG. 2A is a perspective exploded view of a rear wheel drive mechanism of a first preferred embodiment in accordance with the present invention.
Figure 3:
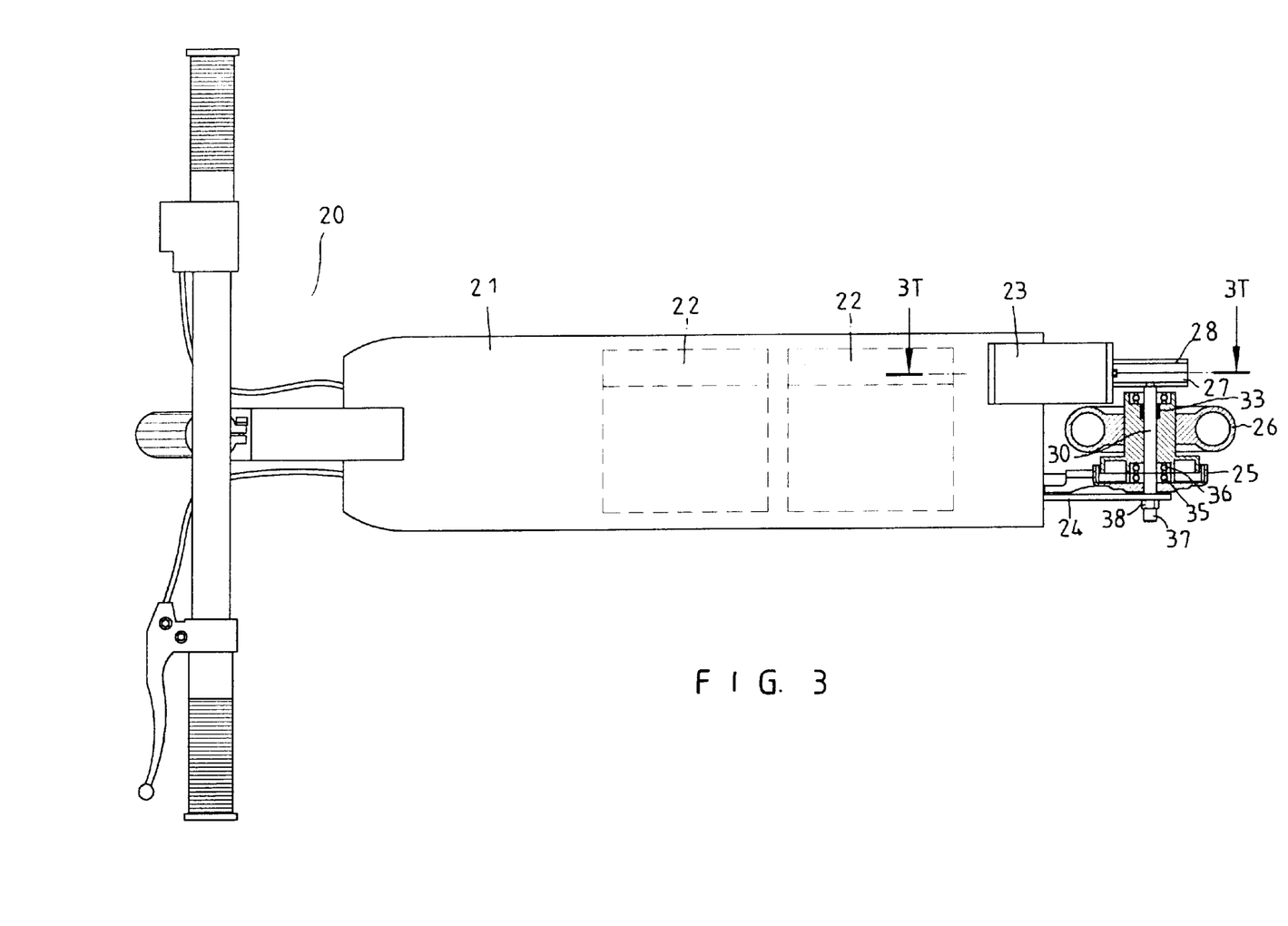
FIG. 3 is a partially sectional assembly view of a scooter of a first preferred embodiment in accordance with the present invention.
Figure 3A:
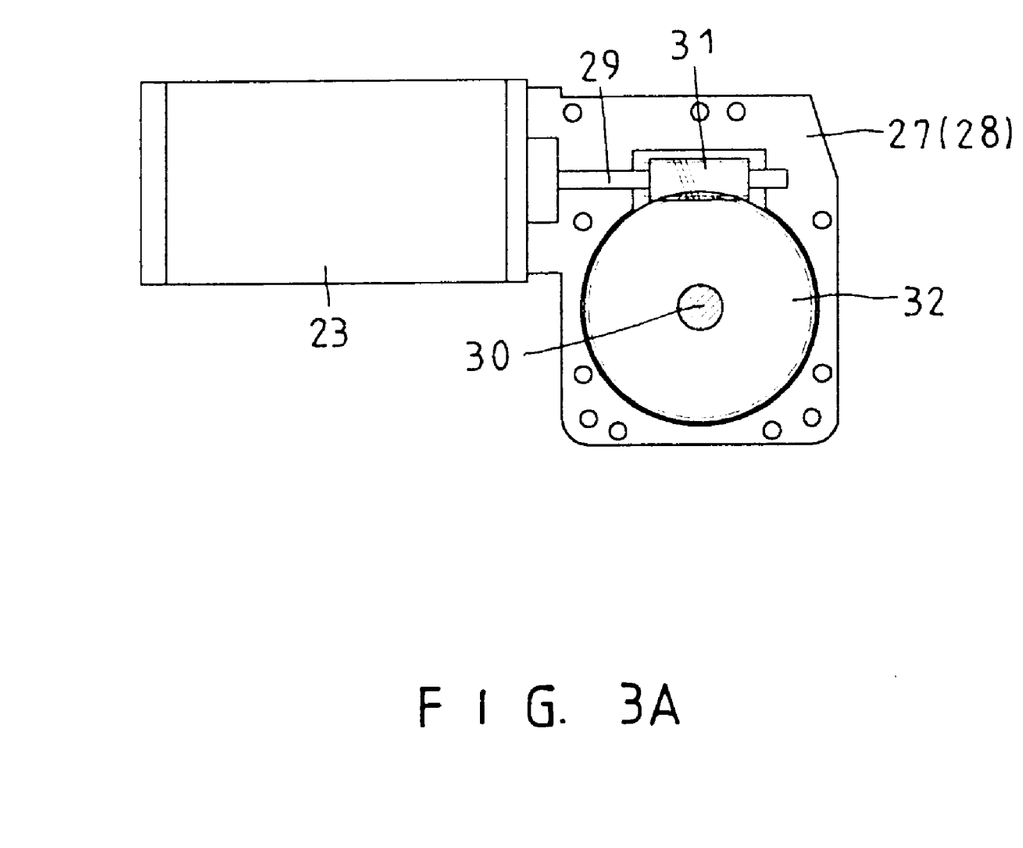
FIG. 3A is a sectional view taken along line 3T—3T in FIG. 3.

Referring to FIGS. 2 to 3A, a first scooter 20 comprises a main frame 21, two rear bars 24, a rear wheel 26, and a rear wheel drive mechanism.

The rear bars 24 are disposed on a rear end of the main frame 21.

The rear wheel drive mechanism has a rechargeable battery set 22 disposed on a bottom of the main frame 21, an electric motor 23 disposed on a rear portion of the main frame 21, a brake device 25, a first protective casing 27, a worm wheel 32, and a second protective casing 28.

The brake device 25, the rear wheel 26, the first protective casing 27, the worm wheel 32, and the second protective casing 28 are disposed between the rear bars 24.

The rear wheel 26 has a main bearing 36.

The electric motor 23 has a drive shaft 29 and a worm 31 surrounding the drive shaft 29.

The worm wheel 32 has a pivot shaft 30 passing through the first protective casing 27, a one-way bearing 33, the rear wheel 26, the main bearing 36, an auxiliary bearing 35, and the pivot shaft 30 inserted in the brake device 25.

The brake device 25 has a threaded post 37 passing through one of the rear bars 24.

A nut 38 engages with the threaded post 37.

The worm 31 engages with the worm wheel 32.

A plurality of screws 34 fasten the first protective casing 27 and the second protective casing 28 on the electric motor 23.

Figure 4:
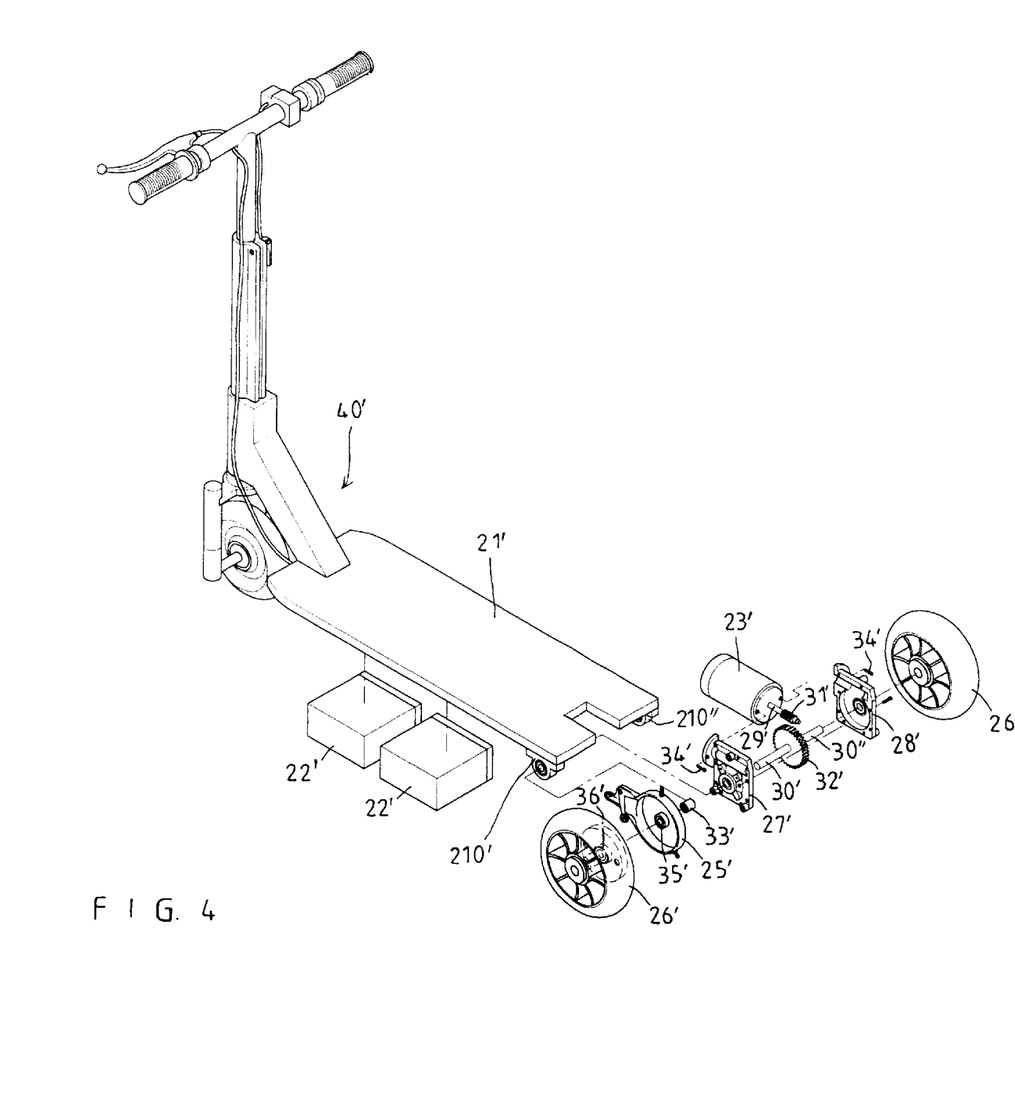
FIG. 4 is a perspective exploded view of a scooter of a second preferred embodiment in accordance with the present invention.
Figure 4A:
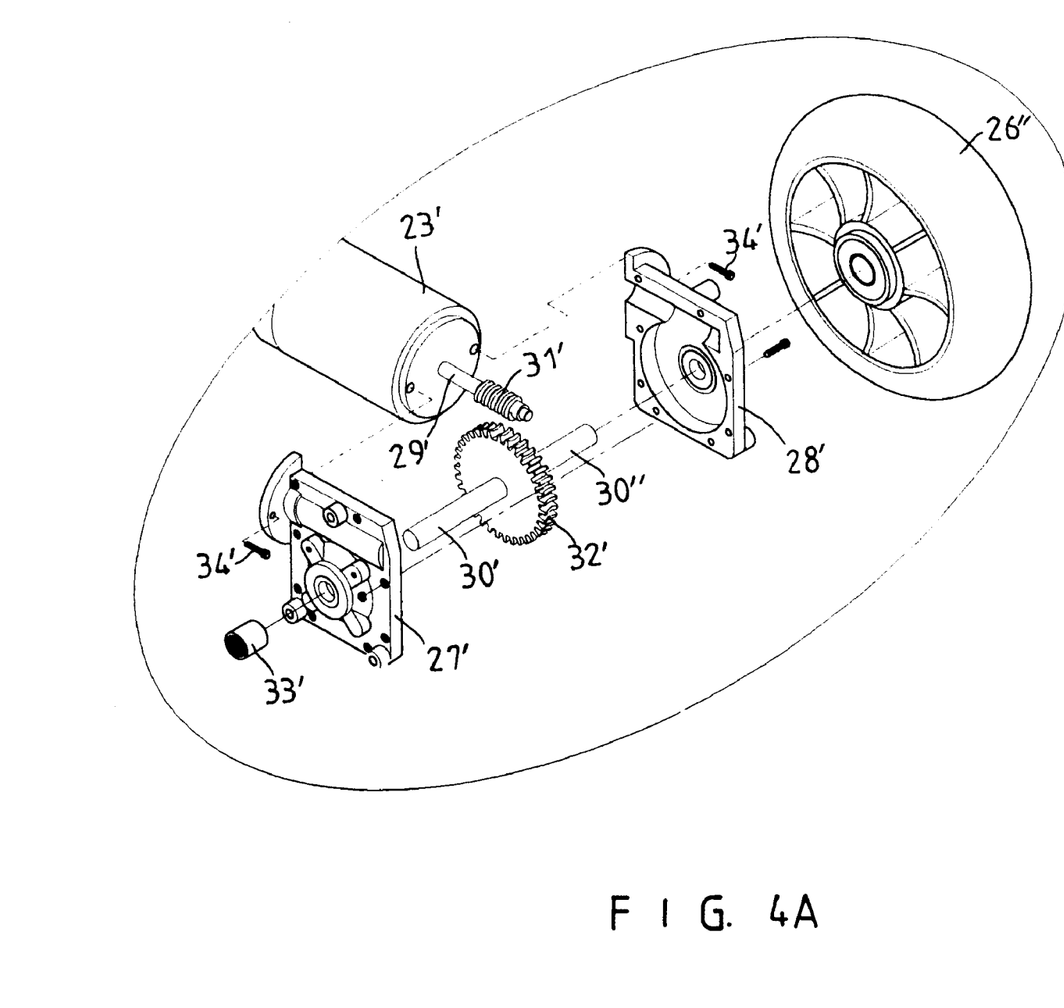
FIG. 4A is a perspective exploded view of a rear wheel drive mechanism of a second preferred embodiment in accordance with the present invention.
Figure 5:
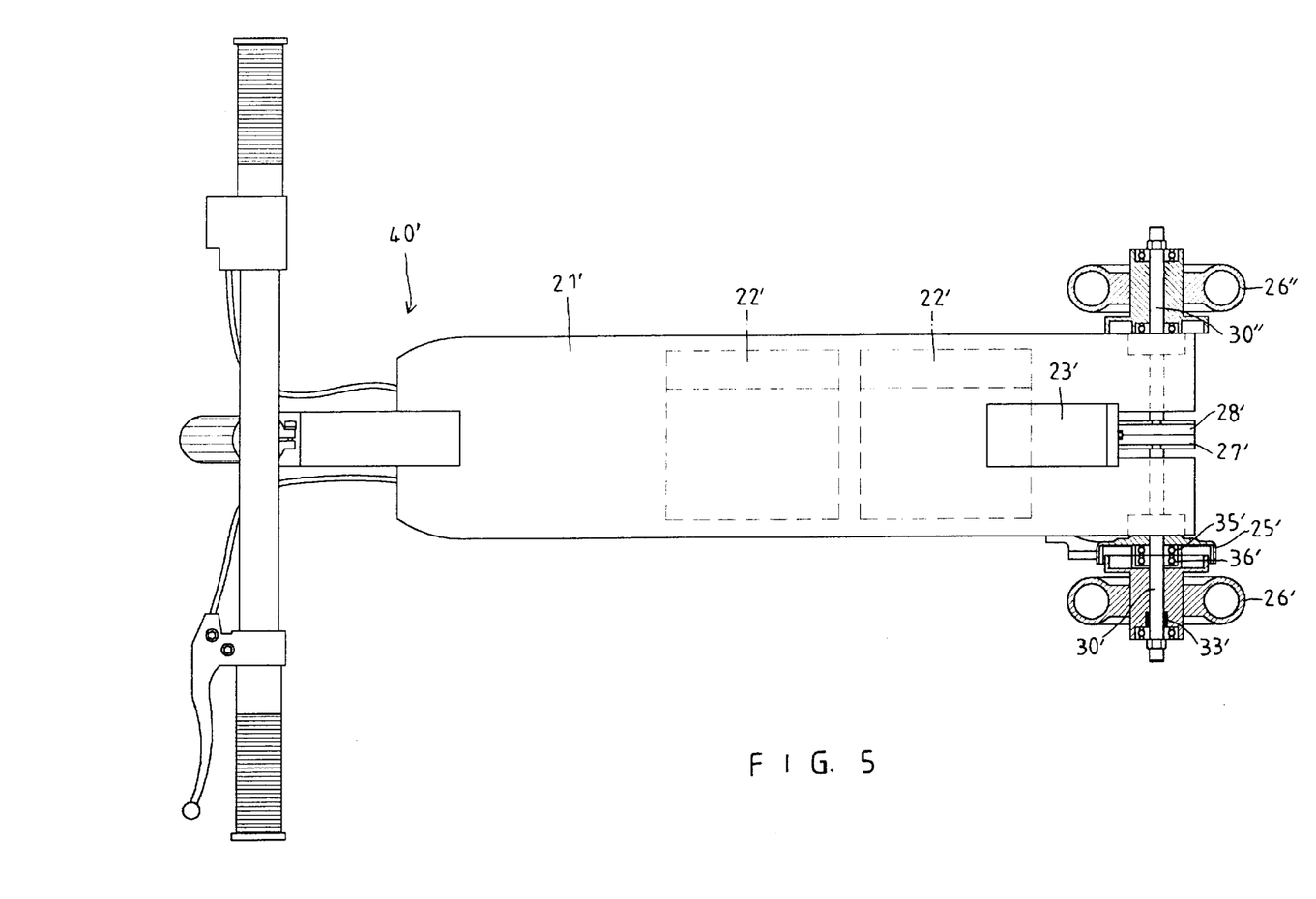
FIG. 5 is a partially sectional assembly view of a scooter of a second preferred embodiment in accordance with the present invention.

Referring to FIGS. 4, 4A and 5, a second scooter 20' comprises a main frame 21', a first rear wheel 26', a second rear wheel 26", and a rear wheel drive mechanism.

The rear wheel drive mechanism has a rechargeable battery set 22' disposed on a bottom of the main frame 21', an electric motor 23' disposed on a rear portion of the main frame 21', a brake device 25', a first protective casing 27', a worm wheel 32', and a second protective casing 28'.

A first lower lug 210' and a second lower lug 210" are disposed on a rear end of the main frame 21'.

An auxiliary bearing 35' is disposed on the brake device 25'.

The first rear wheel 26' has a main bearing 36'.

The electric motor 231 has a drive shaft 29' and a worm 31' surrounding the drive shaft 29'.

The worm wheel 32' has a first pivot shaft 30' passing through the first protective casing 27', the first lower lug 210', a one-way bearing 33', the brake device 25', the auxiliary bearing 35', the main bearing 36' and the first rear wheel 26', and a second pivot shaft 30" passing through the second protective casing 28', the second lower lug 210" and the second rear wheel 26".

The worm 31' engages with the worm wheel 32'.

A plurality of screws 34' fasten the first protective casing 27' and the second protective casing 28' on the electric motor 23'.

The present invention is not limited to the above embodiment but various modification thereof may be made. Furthermore, various changes in form and detail may be made without departing from the scope of the present invention.

I claim:

1. A scooter comprises:
    a main frame, a first rear wheel, a second rear wheel, and a rear wheel drive mechanism,
    the rear wheel drive mechanism having a rechargeable battery set disposed on a bottom of the main frame, an electric motor disposed on a rear portion of the main frame, a brake device, a first protective casing, a worm wheel, and a second protective casing,
    a first lower lug and a second lower lug disposed on a rear end of the main frame,
    an auxiliary bearing disposed on the brake device, the first rear wheel having a main bearing, the electric motor having a drive shaft and a worm surrounding the drive shaft, the worm wheel having a first pivot shaft passing through the first protective casing, the first lower lug, a one-way bearing, the brake device, the auxiliary bearing, the main bearing and the first rear wheel, and a second pivot shaft passing through the second protective casing, the second lower lug and the second rear wheel, the worm engaging with the worm wheel, and a plurality of screws fastening the first protective casing and the second protective casing on the electric motor.

2. A scooter comprises:

a main frame, two rear bars, a rear wheel, and a rear wheel drive mechanism, the rear bars disposed on a rear end of the main frame, the rear wheel drive mechanism having a rechargeable battery set disposed on a bottom of the main frame, an electric motor disposed on a rear portion of the main frame, a brake device, a first protective casing, a worm wheel, and a second protective casing, the brake device, the rear wheel, the first protective casing, the worm wheel, and the second protective casing disposed between the rear bars, the rear wheel having a main bearing, the electric motor having a drive shaft and a worm surrounding the drive shaft, the worm wheel having a pivot shaft passing through the first protective casing, a one-way bearing, the rear wheel, the main bearing, an auxiliary bearing, and the pivot shaft inserted in the brake device, the brake device having a threaded post passing through one of the rear bars, a nut engaging with the threaded post, the worm engaging with the worm wheel, and a plurality of screws fastening the first protective casing and the second protective casing on the electric motor.

* * * * *